United States Patent
Ikeda et al.

(10) Patent No.: US 11,231,199 B2
(45) Date of Patent: Jan. 25, 2022

(54) AIR-CONDITIONING APPARATUS WITH LEAK DETECTION CONTROL

(71) Applicant: Mitsubishi Electric Corporation, Chiyoda-ku (JP)

(72) Inventors: Soshi Ikeda, Chiyoda-ku (JP); Jun Nishio, Chiyoda-ku (JP); Katsuhiro Ishimura, Chiyoda-ku (JP); Kohei Ogura, Chiyoda-ku (JP); Koji Yamashita, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 150 days.

(21) Appl. No.: 16/639,893

(22) PCT Filed: Oct. 5, 2017

(86) PCT No.: PCT/JP2017/036264
§ 371 (c)(1),
(2) Date: Feb. 18, 2020

(87) PCT Pub. No.: WO2019/069422
PCT Pub. Date: Apr. 11, 2019

(65) Prior Publication Data
US 2020/0271344 A1 Aug. 27, 2020

(51) Int. Cl.
*F24F 11/00* (2018.01)
*F24F 11/36* (2018.01)
(Continued)

(52) U.S. Cl.
CPC ............ *F24F 11/36* (2018.01); *F24F 3/06* (2013.01); *F24F 11/84* (2018.01); *F25B 49/02* (2013.01);
(Continued)

(58) Field of Classification Search
CPC .... F24F 3/06; F24F 11/36; F24F 11/84; F25B 2400/19; F25B 2500/222
See application file for complete search history.

(56) References Cited

U.S. PATENT DOCUMENTS 6,615,597 B1 * 9/2003 Domyo ................ F25B 41/31
62/197
2018/0142931 A1 5/2018 Takagi

FOREIGN PATENT DOCUMENTS

EP 3 279 580 A1 2/2018
EP 3 467 406 A1 4/2019
(Continued)

OTHER PUBLICATIONS

Extended European Search Report dated Aug. 25, 2020 in European Patent Application No. 17927961.7, 16 pages.
(Continued)

*Primary Examiner* — Jonathan Bradford
(74) *Attorney, Agent, or Firm* — Xsensus LLP

(57) ABSTRACT

An air-conditioning apparatus includes a refrigeration circuit, a first shut-off device provided at a pipe connecting a heat-source-side heat exchanger and an expansion device, a refrigerant leak detection device, and a controller. The controller controls a flow switching device to switch a connection state between a first connection state in which a discharge side of a compressor is connected to the heat-source-side heat exchanger, and a second connection state in which a suction side of the compressor is connected to the heat-source-side heat exchanger via an accumulator. When a refrigerant leak is detected, the controller performs a refrigerant retrieval operation and a refrigerant transfer operation.

19 Claims, 7 Drawing Sheets

(51) Int. Cl.
*F24F 11/84* (2018.01)
*F24F 3/06* (2006.01)
*F25B 49/02* (2006.01)

(52) U.S. Cl.
CPC ....... *F25B 2400/19* (2013.01); *F25B 2600/11* (2013.01); *F25B 2600/2513* (2013.01); *F25B 2600/2519* (2013.01); *F25B 2700/1931* (2013.01); *F25B 2700/1933* (2013.01)

(56) References Cited

FOREIGN PATENT DOCUMENTS

| | | |
|---|---|---|
| JP | H11-142004 A | 5/1999 |
| JP | 2000-28237 A | 1/2000 |
| JP | 2002-228281 A | 8/2002 |
| JP | 2012-127519 A | 7/2012 |
| JP | 2013-178073 A | 9/2013 |
| JP | 2015-75272 A | 4/2015 |
| JP | 2015-87071 A | 5/2015 |
| JP | 2017-20776 A | 1/2017 |
| JP | 2017-36890 A | 2/2017 |
| JP | 6079055 B2 | 2/2017 |
| JP | 6081033 B1 | 2/2017 |
| WO | WO 2016/157519 A1 | 10/2016 |

OTHER PUBLICATIONS

Office Action dated Mar. 3, 2021, in corresponding Chinese patent Application No. 201780095527.9, 18 pages.
International Search Report dated Dec. 26, 2017 in PCT/JP2017/036264 filed on Oct. 5, 2017, therein, 2 pages.

\* cited by examiner

FIG. 5

|  | COOLING OPERATION | REFRIGERANT RETRIEVAL OPERATION | REFRIGERANT TRASFER OPERATION | OUTFLOW PREVENTION OPERATION |
|---|---|---|---|---|
| COMPRESSOR 10 | DRIVEN | DRIVEN | STOPPED | STOPPED |
| FLOW SWITCHING DEVICE 11 | FIRST CONNEC-TION STATE | FIRST CONNEC-TION STATE | SEOND CONNEC-TION STATE | SEOND CONNEC-TION STATE |
| FIRST SHUT-OFF DEVICE 15 | OPENED | CLOSED | CLOSED | CLOSED |
| HEAT-SOURCE-SIDE FAN 16 | DRIVEN | DRIVEN | DRIVEN | STOPPED |
| EXPANSION DEVICE 20 | OPENED | OPENED | OPENED | CLOSED |
| USE-SIDE FAN 22 | DRIVEN | DRIVEN | DRIVEN | DRIVEN |

FIG. 6

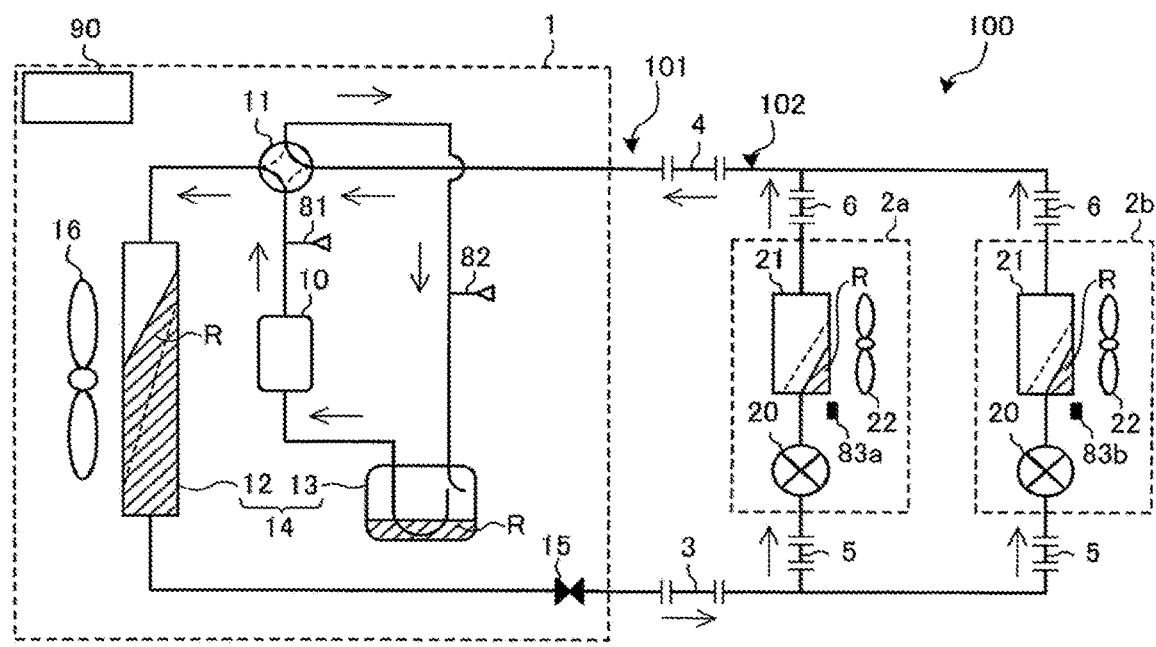

AIR-CONDITIONING APPARATUS WITH LEAK DETECTION CONTROL

CROSS-REFERENCE TO RELATED APPLICATIONS

This application is a United States national stage application of International Application No. PCT/JP2017/036264, filed Oct. 5, 2017, which designates the United States, and the entire contents of the above application is hereby incorporated herein by reference in entirety.

TECHNICAL FIELD

The present invention relates to an air-conditioning apparatus where refrigerant circulates in a refrigeration circuit, and is to reduce the amount of refrigerant leakage into a room.

BACKGROUND ART

In the past, the following air-conditioning apparatus has been known. The air-conditioning apparatus includes a refrigerant circuit in which an outdoor unit is connected to a plurality of indoor units, and a refrigerant leak detection device that detects a refrigerant leak from one or ones of the indoor units. When a refrigerant leak is detected, the air-conditioning apparatus circulates refrigerant such that the pressure of refrigerant in an indoor circuit is reduced (see, for example, Patent Literature 1). In Patent Literature 1, in the case where refrigerant leaks from an indoor unit, a leak rate of the refrigerant is reduced by reducing the pressure difference between a refrigerant pressure at the indoor unit and an atmospheric pressure in an indoor space. To be more specific, for example, the opening degree of an expansion valve provided between an outdoor heat exchanger and an indoor heat exchanger is controlled to be reduced.

Furthermore, in the past, the following air-conditioning apparatus has also been known. In the air-conditioning apparatus, a bypass is provided, and when refrigerant leaks from an indoor unit, refrigerant in the indoor unit is retrieved therefrom to an outdoor unit through the bypass (for example, see Patent Literature 2). The air-conditioning apparatus disclosed in Patent Literature 2 includes a refrigerant circuit in which a compressor, a four-way valve, an outdoor heat exchanger, an outdoor expansion device, a first open/close valve, an indoor expansion device, an indoor heat exchanger, a second open/close valve, and an accumulator are connected by pipes, and a bypass including a bypass expansion device. The bypass branches off from a pipe between the outdoor expansion device and the first open/close valve, and is connected to an inflow side of the accumulator. When a refrigerant leak is detected, the air-conditioning apparatus of Patent Literature 2 switches a connection state of the four-way valve to a connection state for cooling, and performs a refrigerant retrieval. First, the indoor expansion device, the outdoor expansion device, and the first open/close valve are closed, the second open/close valve is opened, and a gas refrigerant retrieval operation to retrieve gas refrigerant is performed. Next, the indoor expansion device, the outdoor expansion device, and the second open/close valve are closed, the first open/close valve is opened, and a liquid refrigerant retrieval operation to retrieve liquid refrigerant is performed.

CITATION LIST

Patent Literature

Patent Literature 1: Japanese Unexamined Patent Application Publication No. 2013-178073
Patent Literature 2: Japanese Unexamined Patent Application Publication No. 2015-87071

SUMMARY OF INVENTION

Technical Problem

However, in such an air-conditioning apparatus as described in Patent Literature 1, the amount of refrigerant leak is reduced by reducing the refrigerant pressure at an indoor unit to a low pressure, and after a refrigerant leak is detected by the refrigerant leak detection device detects a refrigerant leak, refrigerant still continues to leak until an indoor unit in which the refrigerant leak occurs is repaired. By contrast, in such an air-conditioning apparatus as described in Patent Literature 2, although a refrigerant retrieval is performed, the liquid refrigerant retrieval operation is performed after the gas refrigerant retrieval operation is performed, and thus in the case where refrigerant leaks in a region where liquid refrigerant is present, there is a case where the amount of refrigerant that leaks into an indoor space is increased.

The present invention has been made to solve the above problems, and an object of the invention is to provide an air-conditioning apparatus capable of reducing, in the case where a refrigerant leak occurs, the amount of refrigerant that leaks into an indoor space.

Solution to Problem

An air-conditioning apparatus according to an embodiment of the present invention includes: a refrigeration circuit in which a compressor, a flow switching device, a heat-source-side heat exchanger, an expansion device, a use-side heat exchanger, and an accumulator are connected by pipes, the compressor being provided to compress refrigerant and discharge the compressed refrigerant, the flow switching device being provided on a discharge side of the compressor and being provided to change a flow passage of the refrigerant in a switching manner, the expansion device being provided to reduce a pressure of the refrigerant, the use-side heat exchanger being provided to condition air in an indoor space, the accumulator being provided on a suction side of the compressor and provided to store liquid refrigerant; a first shut-off device provided at a pipe that connects the heat-source-side heat exchanger and the expansion device; a refrigerant leak detection device that detects a leak of refrigerant into the indoor space; and a controller that controls the compressor, the flow switching device, and the first shut-off device, and causes a leak-amount reduction operation to be performed when the refrigerant leak detection device detects the leak of refrigerant. The controller controls the flow switching device to switch a connection state set by the flow switching device between a first connection state and a second connection state, the first connection state being a connection state in which the discharge side of the compressor is connected to the heat-source-side heat exchanger and the suction side of the compressor is connected to the use-side heat exchanger via the accumulator, the second connection state being a connection state in which the discharge side of the compressor is connected to the use-side heat exchanger and the suction side of the compressor is connected to the heat-source-side heat exchanger via the accumulator. At the time of performing the leak-amount reduction operation, the controller exerts control to perform a refrigerant retrieval operation and a refrigerant transfer operation. In the refrigerant retrieval operation, the first shut-off device is closed, the flow switching device is caused to switch the connection state to the first connection state, the compressor is driven, and refrigerant in the use-side heat exchanger is retrieved therefrom into a storage unit including the accumulator and the heat-source-side heat exchanger. In the refrigerant transfer operation, the flow switching device is caused to switch the connection state to the second connection state, the compressor is stopped, and refrigerant condensed at the heat-source-side heat exchanger is transferred to the accumulator through the flow switching device.

Advantageous Effects of Invention

In the air-conditioning apparatus according to the embodiment of the present invention, in the refrigerant retrieval operation, refrigerant in a use-side circuit can be retrieved therefrom into a heat-source-side circuit to reduce the amount of refrigerant in the use-side circuit, while reducing a refrigerant leak from the use-side circuit, and in the refrigerant transfer operation, the amount of refrigerant stored in the storage unit can be increased. In such a manner, it is possible to provide an air-conditioning apparatus capable of reducing the amount of a leak of refrigerant into an indoor space when a refrigerant leak occurs.

BRIEF DESCRIPTION OF DRAWINGS

FIG. 5 is a diagram illustrating a state of each of actuators in a leak-amount reduction mode of the air-conditioning apparatus according to Embodiment 1 of the present invention.

FIG. 6 is a diagram illustrating an example of the flow of refrigerant in a refrigerant retrieval operation of the air-conditioning apparatus according to Embodiment 1 of the present invention.

DESCRIPTION OF EMBODIMENTS

Embodiment 1

<Air-Conditioning Apparatus>

Figure 1:
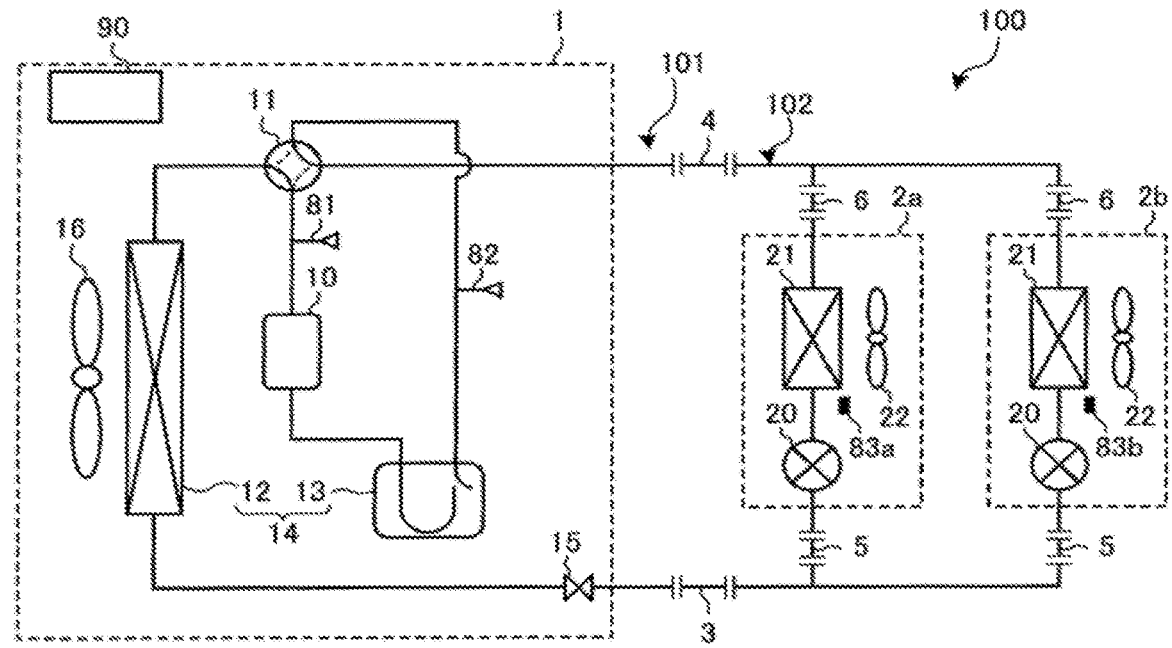
FIG. 1 is a diagram schematically illustrating an example of a circuit configuration of an air-conditioning apparatus according to Embodiment 1 of the present invention.

FIG. 1 is a diagram schematically illustrating an example of a circuit configuration of an air-conditioning apparatus according to Embodiment 1 of the present invention. In Embodiment 1, an air-conditioning apparatus 100 includes a refrigerant circuit 101 in which an outdoor unit 1 and two indoor units 2a and 2b are connected by a main liquid pipe 3, a main gas pipe 4, branch liquid pipes 5, and branch gas pipes 6. The air-conditioning apparatus 100 also includes a controller 90, and performs normal operations such as a cooling operation, a heating operation, etc., and a leak-amount reduction operation, etc.

The branch liquid pipes 5 connect the main liquid pipe 3 and the respective indoor units 2a and 2b, and the branch gas pipes 6 connect the main gas pipe 4 and the respective indoor units 2a and 2b. In the following, with respect to the refrigerant circuit 101, a circuit of the outdoor unit 1 will be referred to as a heat-source-side circuit; and the main liquid pipe 3, the branch liquid pipes 5, circuits of the indoor units 2a and 2b, the branch gas pipes 6, the main gas pipe 4, etc., will be referred to as a use-side circuit 102. It should be noted that FIG. 1 illustrates an example in which the indoor units 2a and 2b are connected in parallel to the outdoor unit 1 by the main liquid pipe 3, the main gas pipe 4, the two branch liquid pipes 5, and the two branch gas pipes 6. In such a manner, although two indoor units are illustrated, the number of indoor units may be one, or may be three or more.

<Outdoor Unit>

For example, the outdoor unit 1 operates as a heat source apparatus that is installed outside an indoor space, that is, installed in an outdoor space, and that dissipates heat obtained by air-conditioning or supplies heat for air-conditioning. The outdoor unit 1 includes, for example, a compressor 10, a flow switching device 11, a heat-source-side heat exchanger 12, an accumulator 13, and a first shut-off device 15, and these elements are connected by pipes and installed in a housing of the outdoor unit. The outdoor unit 1 further includes a heat-source-side fan 16 that sends air to the heat-source-side heat exchanger 12.

The compressor 10 suctions refrigerant and compresses the refrigerant into a high-temperature, high-pressure refrigerant. The compressor 10 is, for example, an inverter compressor the capacity of which can be controlled. The flow switching device 11 is, for example, a four-way valve, and switches a refrigerant flow passage between a refrigerant flow passage in a heating operation mode and that in a cooling operation mode.

In the following, a connection state set by the flow switching device 11 in the cooling operation mode will be referred to as a first connection state, and a connection state set by the flow switching device 11 in the heating operation mode will be referred to as a second connection state. In the first connection state, a discharge side of the compressor 10 is connected to the heat-source-side heat exchanger 12. In the second connection state, a suction side of the compressor 10 is connected to the heat-source-side heat exchanger 12 via the accumulator 13.

The heat-source-side heat exchanger 12 operates as a condenser or a gas cooler in the cooling operation mode, and operates as an evaporator in the heating operation mode, and causes heat exchange to be performed between refrigerant and air supplied from the heat-source-side fan 16. The accumulator 13 is provided on the suction side of the compressor 10, and stores surplus refrigerant the amount of which corresponds to the difference between the amount of the refrigerant that flows during the heating operation mode and the amount of the refrigerant that flows during the cooling operation mode, or the amount of which corresponds to the difference between the amount of the refrigerant that flows after a transient change of the operation and the amount of the refrigerant that flows before the transient change of the operation. When a refrigerant leak occurs and refrigerant retrieval is performed, the heat-source-side heat exchanger 12 and the accumulator 13 serve as a storage unit 14 that stores refrigerant that is retrieved to the outdoor unit 1.

The first shut-off device 15 has a function of shutting off the supply of refrigerant to the indoor units 2a and 2b when refrigerant leaks from at least one of the two indoor units 2a and 2b. As the first shut-off device 15, for example, a solenoid valve which can be controlled in opening/closing or an electronic expansion valve whose opening degree can be variably controlled may be used. The following description is made by referring to by way of example the case where the first shut-off device 15 is a solenoid valve. The first shut-off device 15 is provided downstream of the heat-source-side heat exchanger 12 in the flow direction of refrigerant in the cooing operation mode. The first shut-off device 15 is open during the normal operation, and is closed during the leak-amount reduction operation.

Furthermore, the outdoor unit 1 includes a discharge pressure sensor 81 and a suction pressure sensor 82. The discharge pressure sensor 81 detects the pressure of refrigerant on the discharge side of the compressor 10, that is, on a high-pressure side. The suction pressure sensor 82 detects the pressure of refrigerant on the suction side of the compressor 10, that is, on a low-pressure side.

<Indoor Unit>

The indoor units 2a and 2b are installed, for example, in respective rooms, that is, in respective indoor spaces, and supply conditioned air to the indoor spaces. In the following, the configuration of the indoor unit 2a only is described on the premise that the indoor unit 2a and the indoor unit 2b have the same configuration. The indoor unit 2a includes an expansion device 20, a use-side heat exchanger 21, and a use-side fan 22. Although it is not illustrated, the indoor unit 2a further includes a temperature sensor that detects an indoor temperature, etc.

The expansion device 20 has the function of a pressure reducing valve or an expansion valve that expands refrigerant to reduce the pressure of the refrigerant. It is appropriate that as the expansion device 20, for example, an electronic expansion valve whose opening degree can be variably controlled is used. The expansion device 20 is provided upstream of the use-side heat exchanger 21 in the flow direction of refrigerant in the cooling operation mode.

The use-side heat exchanger 21 causes heat exchange to be performed between air and refrigerant, thereby generating air for heating or air for cooling which is to be supplied into the indoor space. The use-side heat exchanger 21 is supplied with indoor air by the use-side fan 22. The use-side heat exchanger 21 is connected to the suction side of the compressor 10 via the accumulator 13 when the connection state set by the flow switching device 11 is the first connection state, and is connected to the discharge side of the compressor 10 when the connection state set by the flow switching device 11 is the second connection state.

It should be noted that although the above description is made with respect to the case where the indoor unit 2a is installed in the indoor space and the use-side heat exchanger 21 causes indoor air and refrigerant to directly exchange heat with each other, thereby generating conditioned air, this is not restrictive. For example, the air-conditioning apparatus 100 may further include a heat medium circuit in which a heat medium such as water is circulated. In this case, the heat medium circuit includes a heat medium transfer device that transfers a heat medium, such as a pump, and a heat medium heat exchanger that causes heat exchange to be performed between the heat medium and refrigerant in the refrigeration circuit. Then, air in the indoor space is conditioned by the heat medium subjected to heat exchange at the heat medium heat exchanger.

Furthermore, the indoor units 2a and 2b include refrigerant leak detection devices 83a and 83b, respectively. The refrigerant leak detection devices 83a and 83b are, for example, refrigerant concentration sensors, and detect whether or not a refrigerant leak occurs in or around the indoor units 2a and 2b, respectively. It should be noted that the refrigerant leak detection devices 83a and 83b may measure a refrigerant concentration, and the controller 90 may determine whether a refrigerant leak occurs or not.

A detection threshold for use in refrigerant leak detection by the refrigerant leak detection devices 83a and 83b is set less than or equal to a lower flammable limit of refrigerant to be applied. In particular, it should be noted that preferably, the detection threshold should be set to a value (for example, a concentration of $1/5$, $1/10$ or $1/20$ of the lower flammable limit) which would not reach the lower flammable limit in view of the leak amount of refrigerant which would increase while the leak-amount reduction mode continues.

<Controller>

The controller 90 controls the entire air-conditioning apparatus 100, and includes an analog circuit, a digital circuit, or a CPU, or includes two or more of these elements. The controller 90 further includes a memory, a timer, etc. The controller 90 causes the air-conditioning apparatus 100 to operate in a selected one of operation modes on the basis of detection information obtained by various sensors, an instruction input by a remote control unit or other devices, and setting values set in advance, etc., and the controller 90 also controls each of actuators.

In the air-conditioning apparatus 100, the indoor units 2a and 2b perform the cooling operation or the heating operation in response to instructions from the respective indoor units 2a and 2b. Operation modes of the air-conditioning apparatus 100 as illustrated in FIG. 1 are a cooling operation mode in which all the indoor units 2a and 2b are driven to perform the cooling operation, and a heating operation mode in which all the indoor units 2a and 2b are driven to perform the heating operation. Furthermore, in the case where at least one of the two refrigerant leak detection devices 83a and 83b detects a refrigerant leak, the air-conditioning apparatus 100 is caused to enter the leak-amount reduction mode to reduce the amount of refrigerant that leaks into the indoor space The leak-amount reduction mode includes a refrigerant retrieval operation to retrieve refrigerant from the use-side circuit 102, a refrigerant transfer operation to transfer refrigerant from the heat-source-side heat exchanger 12 to the accumulator 13, and an outflow prevention operation to reduce the outflow of refrigerant retrieved into the heat-source-side circuit to the use-side circuit 102.

Figure 2:
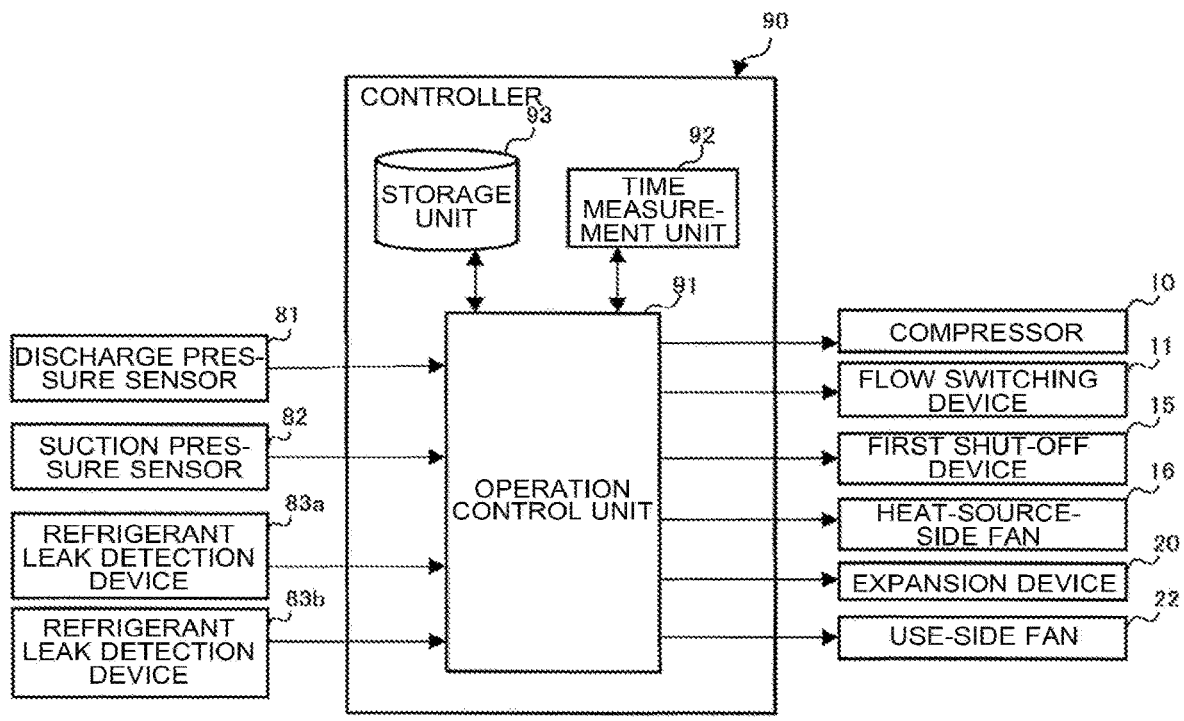
FIG. 2 is a functional block diagram indicating functions of a controller according to Embodiment 1 of the present invention.

FIG. 2 is a functional block diagram indicating functions of the controller in Embodiment 1 of the present invention. The controller 90 includes an operation control unit 91, a time measurement unit 92, and a storage unit 93. The operation control unit 91 performs a main operation control. The storage unit 93 stores various control values for use in controlling the actuators, setting values for use in switching the operation mode and also switching the operation, and other values. The time measurement unit 92 has a timer function, measures time and makes a notification indicating the time.

To the operation control unit 91, the following items are input: an instruction from an input device; an indoor temperature detected by each of the temperature sensors; a discharge pressure Pd detected by the discharge pressure sensor 81; a suction pressure Ps detected by the suction pressure sensor 82; and refrigerant leakage information detected by each of the refrigerant leak detection devices 83a and 83b. The operation control unit 91 causes the air-conditioning apparatus 100 to enter an operation mode on the basis of the input information, setting values, etc. To be more specific, the operation control unit 91 controls a driving rotation speed of the compressor 10, a switching operation of the flow switching device 11, opening and closing of the first shut-off device 15, a rotation speed of the heat-source-side fan 16, an opening degree of the expansion device 20, a rotation speed of the use-side fan 22, etc.

The setting values stored in the storage unit 93 are, for example, a discharge pressure threshold Pdt, a suction pressure threshold Pst, and a set time Ts. The discharge pressure threshold Pdt is set in advance as a discharge pressure which is detected when the heat-source-side heat exchanger 12 is filled with liquid refrigerant, and is applied as a reference of a start requirement of the refrigerant transfer operation in the case where an indoor unit operates in the leak-amount reduction mode. The suction pressure threshold Pst is set in advance as a suction pressure which is detected when no refrigerant is present in the use-side circuit 102, and is applied as a starting requirement of the outflow prevention operation in the case where an indoor unit operates in the leak-amount reduction mode. The set time Ts is set in advance as time for which the refrigerant transfer operation is performed, and is applied as an ending requirement of the refrigerant transfer operation.

Next, the operation of each of devices and the flow of refrigerant in each of the operation modes will be described.

<Cooling Operation Mode>

Figure 3:
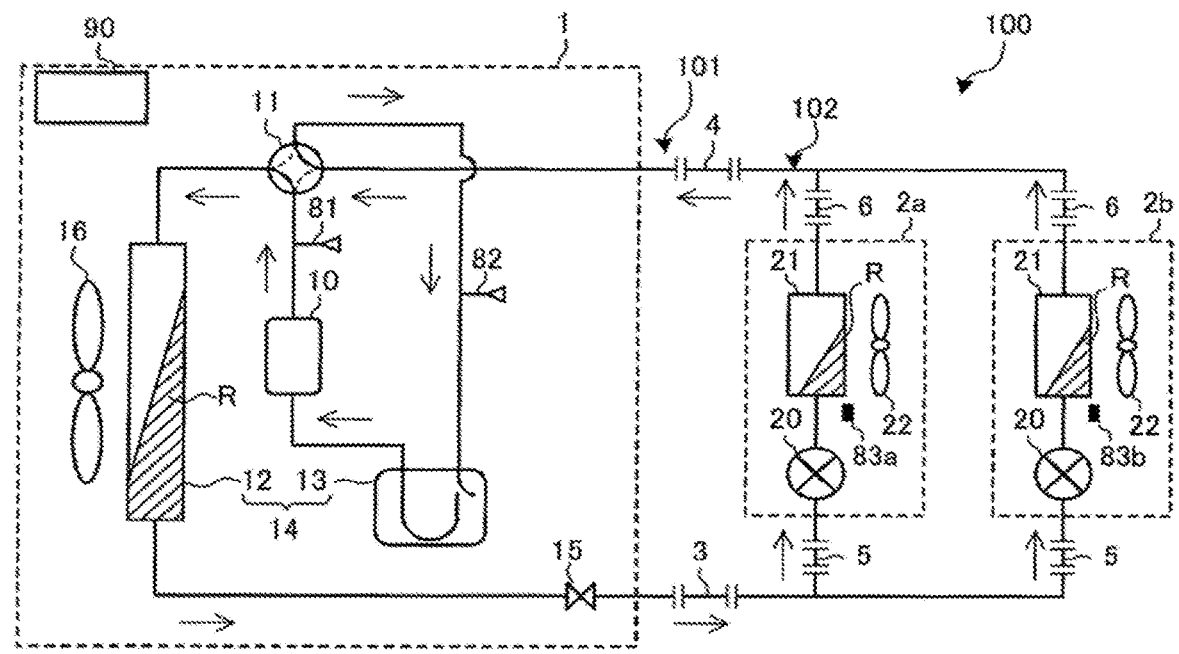
FIG. 3 is a diagram illustrating an example of the flow of refrigerant in a cooling operation mode of the air-conditioning apparatus according to Embodiment 1 of the present invention.

FIG. 3 is a diagram illustrating an example of the flow of refrigerant in the cooling operation mode of the air-conditioning apparatus according to Embodiment 1 of the present invention. A cooling operation mode which is applied when a cooling load is generated at each of the use-side heat exchangers 21 will be described with reference to FIG. 3. In FIG. 3, the flow direction of refrigerant that flows in the refrigerant circuit 101 is indicated by solid arrows, and the liquid refrigerant R in the heat-source-side heat exchanger 12 and those in the use-side heat exchangers 21 are indicated by oblique lines such that the amounts of the liquid refrigerant R can be seen.

In the cooling operation mode, the controller 90 drives the compressor 10, the heat-source-side fan 16, and each of the use-side fans 22, and exerts control to cause the flow switching device 11 to switch the connection state to the first connection state, control to open each of the expansion device 20, and control to fully open the first shut-off device 15. The compressor 10 suctions low-temperature, low-pressure refrigerant, compresses the low-temperature, low-pressure refrigerant into high-temperature, high pressure refrigerant, and discharges the high-temperature, high-pressure refrigerant. The high-temperature, high-pressure refrigerant discharged from the compressor 10 flows into the heat-source-side heat exchanger 12 through the flow switching device 11. At the heat-source-side heat exchanger 12, the refrigerant that has flowed into the heat-source-side heat exchanger 12 exchanges heat with outside air supplied by the heat-source-side fan 16, and is condensed. The refrigerant condensed at the heat-source-side heat exchanger 12 passes through the first shut-off device 15, flows out of the outdoor unit 1, and then flows into the indoor units 2a and 2b through the main liquid pipe 3 and the respective branch liquid pipes 5.

The refrigerant that has flowed into the indoor units 2a and 2b is expanded at the respective expansion devices 20, and flows into the respective use-side heat exchangers 21. At the user-side heat exchangers 21, the refrigerant that has flowed thereinto receives heat from the indoor air, and as a result evaporates while cooling the indoor space. The refrigerant evaporated at the use-side heat exchanger 21 flows through the respective branch gas pipes 6 and the main gas pipe 4, and then flows into the outdoor unit 1. The refrigerant having flowed into the outdoor unit 1 flows through the flow switching device 11, and is re-sucked into the compressor 10 through the accumulator 13.

The distribution of refrigerant in the refrigerant circuit 101 will be described. In the refrigerant circuit 101, the refrigerant is present in a liquid state or a gas state. The refrigerant is largely distributed in part of the refrigerant circuit 101 where refrigerant is present in the liquid state, since the density of a liquid is higher than that of gas. Therefore, in the cooling operation mode, the refrigerant is largely distributed in the heat-source-side heat exchanger 12 where the refrigerant is condensed, the main liquid pipe 3 and the branch liquid pipes 5 through which the liquid refrigerant flows, and the use-side heat exchangers 21 in which the refrigerant is evaporated.

<Heating Operation Mode>

Figure 4:
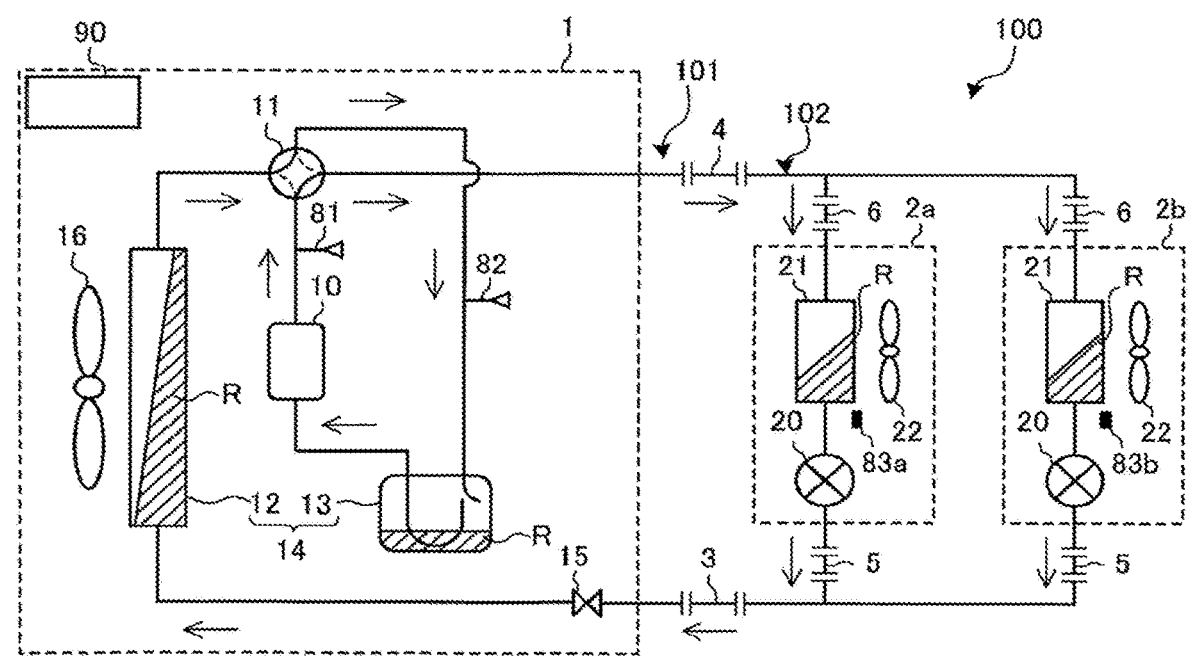
FIG. 4 is a diagram illustrating an example of the flow of refrigerant in a heating operation mode of the air-conditioning apparatus according to Embodiment 1 of the present invention.

FIG. 4 is a diagram indicating an example of the flow of refrigerant in the heating operation mode of the air-conditioning apparatus according to Embodiment 1 of the present invention. A heating operation mode which is applied when a heating load is generated at the use-side heat exchangers 21 will be described with reference to FIG. 4. In FIG. 4, the flow direction of refrigerant that flows in the refrigerant circuit 101 is indicated by solid arrows, and liquid refrigerant R present in the heat-source-side heat exchanger 12, the accumulator 13, and the use-side heat exchangers 21 is indicated by oblique lines.

In the heating operation mode, the controller 90 drives the compressor 10, the heat-source-side fan 16, and the use-side fans 22, and exerts control to cause the flow switching device 11 to switch the connection state to the second connection state, control to open the expansion devices 20 to be opened, and control to fully open the first shut-off device 15. The compressor 10 suctions low-temperature, low-pressure refrigerant, compresses the low-temperature, low-pressure refrigerant into high-temperature, high-pressure refrigerant, and discharges the high-temperature, high-pressure refrigerant. The high-temperature, high-pressure refrigerant discharged from the compressor 10 flows through the flow switching device 11, and flows out of the outdoor unit 1. The high-temperature, high-pressure refrigerant that has flowed out of the outdoor unit 1 flows through the main gas pipe 4 and the branch gas pipes 6, and flows into the use-side heat exchangers 21 in the indoor units 2a and 2b.

At the use-side heat exchangers 21, the refrigerant that has flowed into the use-side heat exchangers 21 transfers heat to the indoor air and as a result condenses while heating the indoor space. The refrigerant that has condensed at the use-side heat exchangers 21 is expanded at the respective expansion devices 20, flows through the respective branch liquid pipes 5 and the main liquid pipe 3, and then flow into the outdoor unit 1. The refrigerant that has flowed into the outdoor unit 1 flows through the first shut-off device 15, flows into the heat-source-side heat exchanger 12, and evaporates at the heat-source-side heat exchanger 12 while receiving heat from outside air. The refrigerant that has evaporated at the heat-source-side heat exchanger 12 flows through the flow switching device 11, and is re-sucked into the compressor 10 through the accumulator 13.

The distribution of refrigerant in the refrigerant circuit 101 will be described. In the heating operation mode, the refrigerant is largely distributed in the use-side heat exchangers 21 where the refrigerant is condensed, the main liquid pipe 3 and the branch liquid pipes 5 through the liquid refrigerant flows, and the heat-source-side heat exchanger 12 where the refrigerant is evaporated.

<Leak-Amount Reduction Mode>

Figure 7:
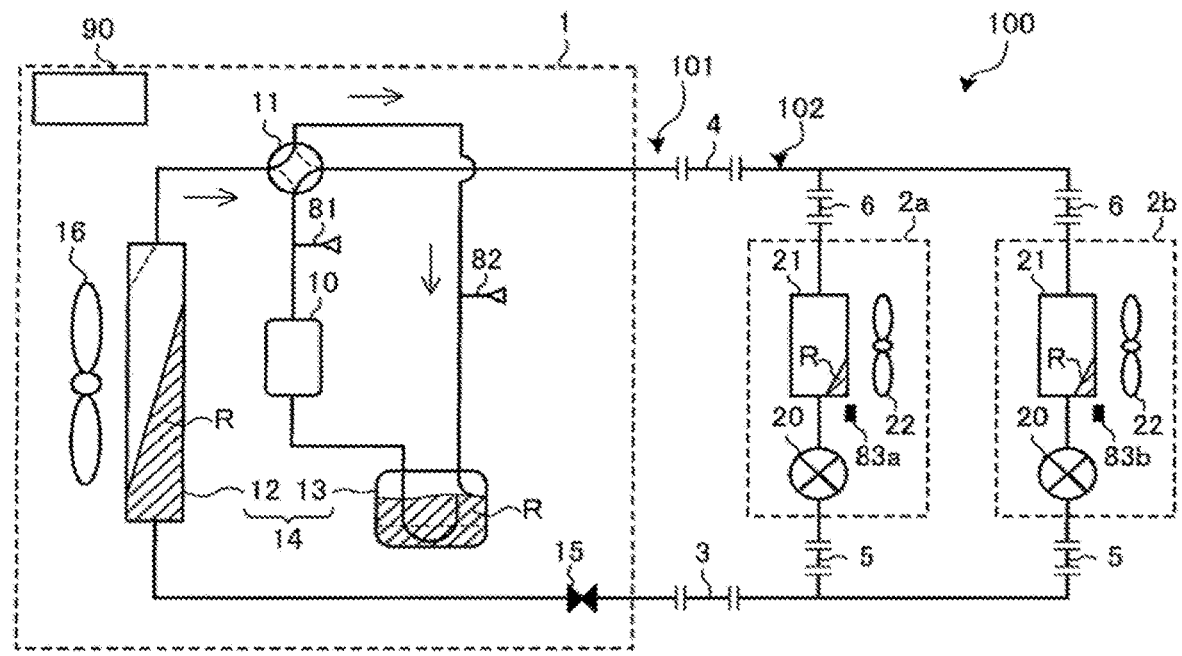
FIG. 7 is a diagram illustrating an example of the flow of refrigerant in a refrigerant transfer operation of the air-conditioning apparatus according to Embodiment 1 of the present invention.
Figure 8:
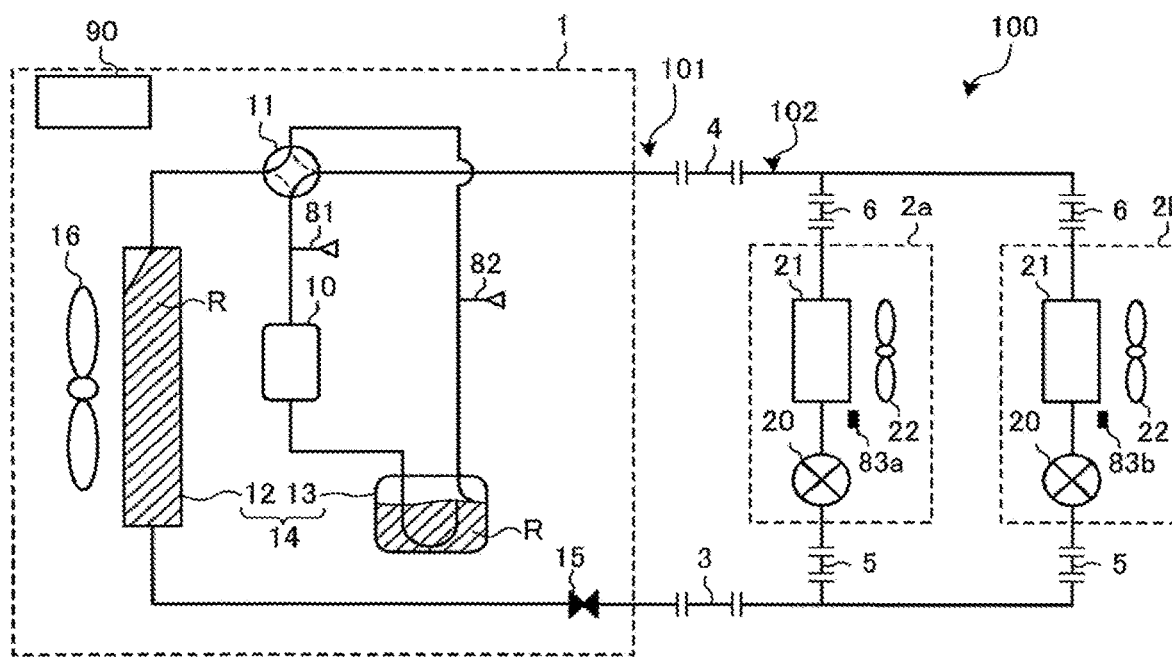
FIG. 8 is a diagram illustrating an example of the flow of refrigerant in an outflow prevention operation of the air-conditioning apparatus according to Embodiment 1 of the present invention.

FIG. 5 is a diagram indicating the states of actuators in the leak-amount reduction mode of the air-conditioning apparatus according to Embodiment 1 of the present invention. FIG. 6 is a diagram illustrating an example of the flow of refrigerant in the refrigerant retrieval operation of the air-conditioning apparatus according to Embodiment 1 of the present invention. FIG. 7 is a diagram illustrating an example of the flow of refrigerant in the refrigerant transfer operation of the air-conditioning apparatus according to Embodiment 1 of the present invention. FIG. 8 is a diagram illustrating an example of the flow of refrigerant in the outflow prevention operation of the air-conditioning apparatus according to Embodiment 1 of the present invention. Each of the operations in the leak-amount reduction mode will be described in detail with reference to FIGS. 5 to 8 by referring to by way of example the case where refrigerant leaks into the indoor space during the normal operation.

<Refrigerant Retrieval Operation>

As illustrated in FIGS. 5 and 6, in the refrigerant retrieval operation, the controller 90 exerts control to cause the flow switching device 11 to switch the connection state to the first connection state. In the case where a previous operation mode is the cooling operation mode, the switching operation of the flow switching device 11 is not necessary, but in the case where the previous operation mode is the heating operation mode or a stop mode, the connection state set by the flow switching device 11 is switched to the first connection state. Furthermore, at the same time as the switching operation of the flow switching device 11, the controller 90 exerts control to close the first shot-off device 15, fully open the expansion devices 20, and drive the heat-source-side fan 16 and the use-side fans 22 at full speed. The controller 90 also exerts control to drive the compressor 10.

The controller 90 controls the rotation speed of the compressor 10 on the basis of the discharge pressure Pd. To be more specific, the discharge pressure Pd measured by the discharge pressure sensor 81 and a target value Pda for the discharge pressure that is registered in advance in the controller 90 are compared with each other, and whether to increase or decrease the frequency of the compressor 10 is determined on the basis of Formula 1.

<Math. 1>

$$Pd < Pda \qquad \text{(Formula 1)}$$

In the case where formula 1 as indicated above is satisfied, and the discharge pressure Pd is less than the target value Pda, the frequency of the compressor 10 is controlled to be increased. By contrast, in the case where formula 1 is not satisfied, and the discharge pressure Pd is greater than the target value Pda, the frequency of the compressor 10 is controlled to be decreased. It is preferable that the target value Pda be set to a value less than the discharge pressure threshold Pdt.

In FIG. 6, the flow direction of refrigerant that flows in the refrigerant circuit 101 is indicated by solid arrows, and liquid refrigerant R in the heat-source-side heat exchanger 12, that in the accumulator 13, and those in the use-side heat exchangers 21 are indicated by oblique lines such that the amounts of the liquid refrigerant R can be seen. In the refrigerant retrieval operation, refrigerant in the use-side circuit 102 flows into the outdoor unit 1 through the main liquid pipe 3, the branch liquid pipes 5, the use-side heat exchangers 21, the branch gas pipes 6, and the main gas pipe 4. The refrigerant that has flowed into the outdoor unit 1 passes through the flow switching device 11 and flows into the accumulator 13; and liquid refrigerant remains in the accumulator 13, and gas refrigerant is sucked into the compressor 10. In the compressor 10, the sucked gas refrigerant is compressed into high-temperature, high-pressure refrigerant, and the high-temperature, high-pressure refrigerant is discharged. The high-temperature, high-pressure refrigerant discharged from the compressor 10 flows into the heat-source-side heat exchanger 12 through the flow switching device 11. The refrigerant that has flowed into the heat-source-side heat exchanger 12 exchanges heat with outside air supplied by the heat-source-side fan 16, and is thus condensed and liquified. Liquid refrigerant R obtained through condensation and liquefaction at the heat-source-side heat exchanger 12 remains in the heat-source-side heat exchanger 12 and a pipe between the heat-source-side heat exchanger 12 and the first shut-off device 15.

Because of the refrigerant retrieval operation, the amount of refrigerant in the use-side circuit 102, for example, in the use-side heat exchangers 21, is reduced, and the amount of refrigerant in the outdoor unit 1, for example, in the heat-source-side heat exchanger 12 and the accumulator 13, is increased. Furthermore, refrigerant that leaks into the indoor space can be agitated by each use-side fan 22, thus reducing an increase in the concentration of refrigerant in a particular region, which would be increased unless the refrigerant were agitated. Furthermore, when the refrigerant retrieval operation is performed, the refrigerant pressure in the use-side circuit 102 is reduced, and the pressure difference between the refrigerant pressure therein and the atmospheric pressure in the indoor space is thus reduced, and a refrigerant leak rate can be reduced.

<Refrigerant Transfer Operation>

As illustrated in FIGS. 5 and 7, in the refrigerant transfer operation, the controller 90 exerts control to cause the flow switching device 11 to switch the connection state to the second connection state, and to stop the compressor 10. Furthermore, the controller 90 exerts control to close the first shut-off device 15, fully open the expansion devices 20, and drive the heat-source-side fan 16 and the use-side fans 22 at full speed. That is, at the time of switching the operation from the refrigerant retrieval operation to the refrigerant transfer operation, the states of the first shut-off device 15, the expansion devices 20, the heat-source-side fan 16, and the use-side fans 22 are maintained.

The refrigerant transfer operation is performed when the heat-source-side heat exchanger 12 is filled with liquid refrigerant R and has no space to store the liquid refrigerant R. Generally, in the case where the heat-source-side heat exchanger 12 is filled with liquid refrigerant R, the discharge pressure Pd of refrigerant from the compressor 10 is greater than in the case where the heat-source-side heat exchanger 12 has space to store the refrigerant. Therefore, it is determined whether the heat-source-side heat exchanger 12 has space or not on the basis of the discharge pressure Pd. To be more specific, the discharge pressure Pd measured by the discharge pressure sensor 81 and the discharge pressure threshold Pdt stored in advance in the storage unit 93 are compared with each other, and whether or not to switch the operation to the refrigerant transfer operation is determined on the basis of formula 2.

<Math. 2>

$$Pd < Pdt \quad \text{(Formula 2)}$$

In the case where formula 2 as indicated above is satisfied, and the current discharge pressure Pd is less than the discharge pressure threshold Pdt, switching to the refrigerant transfer operation is not performed. By contrast, in the case where formula 2 is not satisfied, and the current discharge pressure Pd is greater than or equal to the discharge pressure threshold Pdt, switching of the operation to the refrigerant transfer operation is performed.

In FIG. 7, the flow direction of refrigerant that flows in the refrigerant circuit 101 is indicated by solid arrows, and liquid refrigerant R present before execution of the refrigerant transfer operation and that after execution of the refrigerant transfer operation are indicated by dotted lines and oblique lines, respectively, such that the amounts of the liquid refrigerant R present before and after execution of the refrigerant transfer operation can be seen. When switching to the refrigerant transfer operation is performed, high-pressure liquid refrigerant in the heat-source-side heat exchanger 12 passes through the flow switching device 11 and flows into the accumulator 13. At this time, the pressure in the accumulator 13 is low, and refrigerant flows from the heat-source-side heat exchanger 12 to the accumulator 13 because of the pressure difference. The liquid refrigerant R that has flowed from the heat-source-side heat exchanger 12 into the accumulator 13 stays in the accumulator 13.

Because of the refrigerant transfer operation, the amount of refrigerant in the heat-source-side heat exchanger 12 is decreased, and the amount of refrigerant in the accumulator 13 is increased. Furthermore, the liquid refrigerant is stored not only in the heat-source-side heat exchanger 12 but in the accumulator 13, and a larger amount of refrigerant is thus retrieved into the outdoor unit 1, as compared with the case where the refrigerant is retrieved using the heat-source-side heat exchanger 12 only. Furthermore, when the refrigerant transfer operation is performed, in the use-side circuit 102, the refrigerant pressure is kept low, and thus the pressure difference between the refrigerant pressure in the use-side circuit 102 and the atmospheric pressure in the indoor space is reduced as during the refrigerant retrieval operation, and the refrigerant leak rate can be reduced.

<Outflow Prevention Operation>

As illustrated in FIGS. 5 and 8, in the outflow prevention operation, the controller 90 exerts control to cause the flow switching device 11 to switch the connection state to the second connection state, and to stop the compressor 10. Furthermore, the controller 90 exerts control to close the first shut-off device 15, and to drive each of the use-side fans 22 at full speed. That is, in the case where the refrigerant retrieval operation is changed to the outflow prevention operation, the states of the first shut-off device 15 and each use-side fan 22 are maintained. Furthermore, the controller 90 exerts control to fully close each expansion device 20, and to stop the heat-source-side fan 16.

When refrigerant in the use-side circuit 102 is completely retrieved into the outdoor unit 1, the outflow prevention operation is performed. Generally, the suction pressure Ps is reduced when the amount of refrigerant in the use-side circuit 102 is reduced. Therefore, whether refrigerant in the use-side circuit 102 is completely retrieved or not is determined based on the suction pressure Ps. To be more specific, the suction pressure Ps measured by the suction pressure sensor 82 and the suction pressure threshold Pst stored in advance in the storage unit 93 are compared with each other, and whether or not to change the operation to the outflow prevention operation is determined based on formula 3.

<Math. 3>

$$Ps < Pst \quad \text{(Formula 3)}$$

When formula 3 as indicated above is satisfied, and the current suction pressure Ps is less than the suction pressure threshold Pst, it is determined that refrigerant on the use-side is completely retrieved, and the operation is switched from refrigerant retrieval to the outflow prevention operation. By contrast, when formula 3 is not satisfied, and the current suction pressure Ps is greater than or equal to the suction pressure threshold Pst, it is determined that refrigerant on the use-side is not yet completely retrieved, and that refrigerant retrieval is continued without switching the operation from the refrigerant retrieval to the outflow prevention operation.

In FIG. 8, liquid refrigerant R that is present after execution of the outflow prevention operation is indicated by oblique lines such that the amounts of the refrigerant can be seen. In the outflow prevention operation, no flow of refrigerant is produced in the refrigerant circuit 101. In the flow passage between the use-side circuit 102 and the storage unit 14 that includes the heat-source-side heat exchanger 12 and the accumulator 13, the storage unit 14 is disconnected from the use-side circuit 102 by the compressor 10 and the first shut-off device 15, and the flow of refrigerant from the outdoor unit 1 to the use-side circuit 102 is shut off.

With respect to refrigerant retrieved into the storage unit 14 including the heat-source-side heat exchanger 12 and the accumulator 13, by the outflow prevention operation, the outflow of the refrigerant to the indoor side is reduced, whereby the amount of refrigerant leak at the use-side circuit 102 can be reduced also after refrigerant retrieval. Furthermore, each of the expansion devices 20 can shut off the flow of refrigerant between two sides, that is, the main liquid pipe 3 and an associated one of the branch liquid pipes 5 on one of the two sides and the use-side heat exchangers 21, the branch gas pipes 6, and the main gas pipe 4 on the other of the two sides, and the amount of refrigerant leak after refrigerant retrieval can be further reduced. Furthermore, when the outflow prevention operation is performed, the use-side circuit 102 is kept in a low refrigerant pressure state, and the pressure difference between the pressure in the use-side circuit 102 and the atmospheric pressure in the indoor space is reduced as at the time of performing the refrigerant retrieval operation, and the refrigerant leak rate can be reduced.

Figure 9:
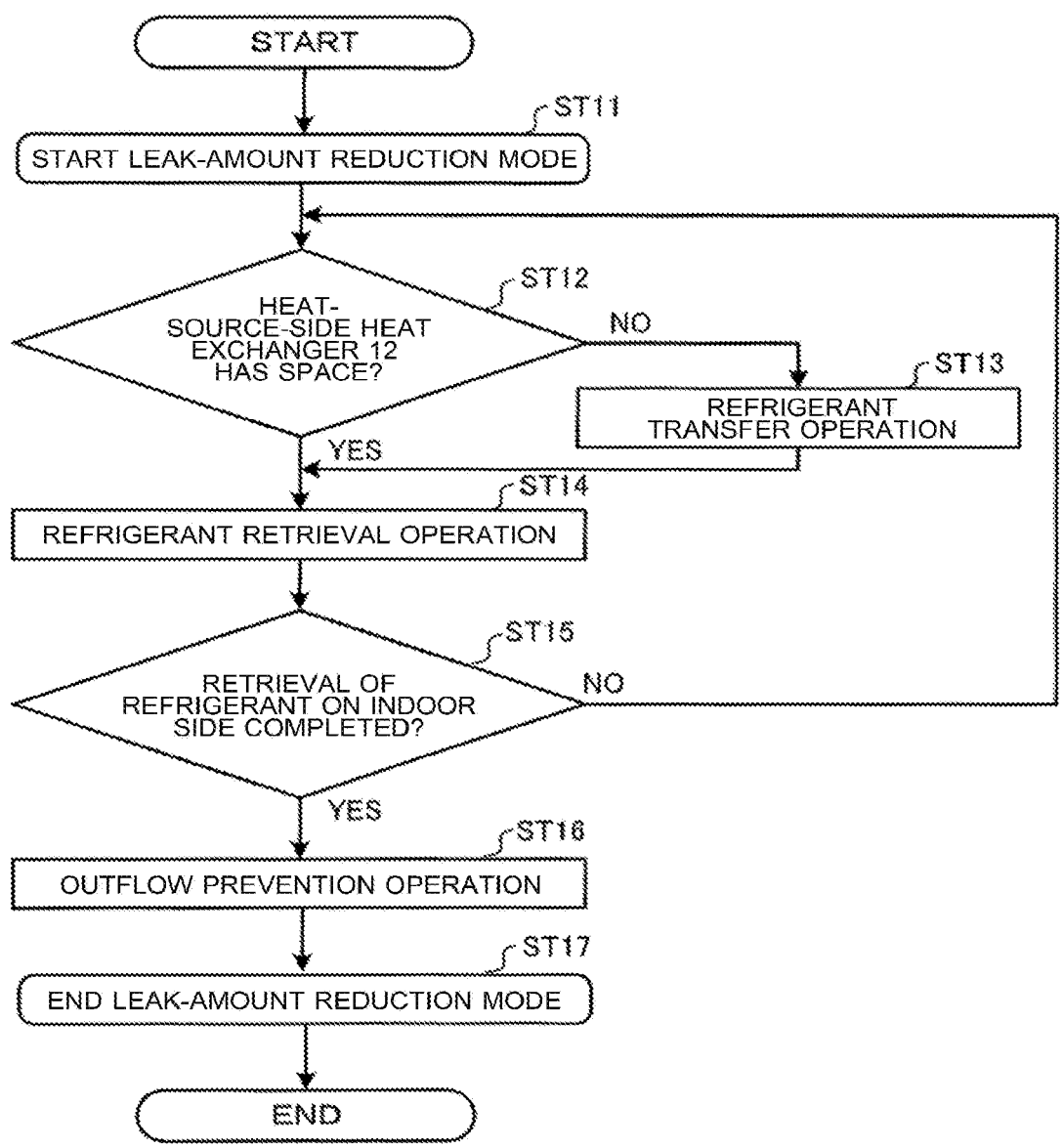
FIG. 9 is a flowchart of a control flow in the leak-amount reduction mode of the air-conditioning apparatus according to Embodiment 1 of the present invention.

FIG. 9 is a flowchart of a control flow in the leak-amount reduction mode of the air-conditioning apparatus according to Embodiment 1 of the present invention. The leak-amount reduction mode as indicated in FIG. 9 is applied, when a refrigerant leak is detected by at least one of the two refrigerant leak detection devices 83a and 83b and detection information is input to the controller 90. The following description is made by referring to by way of example the case where the air-conditioning apparatus 100 operates in the cooling operation mode immediately before the leak-amount reduction mode is applied.

First, the operation control unit 91 switches the operation mode from the cooling operation mode to the leak-amount reduction mode (step ST11). When the leak-amount reduction mode is started, the operation control unit 91 determines whether the heat-source-side heat exchanger 12 has space to store refrigerant or not (step ST12). At this time, the operation control unit 91 exerts control to close the first shut-off device 15, and makes the above determination on the basis of the discharge pressure Pd measured by the discharge pressure sensor 81.

When determining that the heat-source-side heat exchanger 12 does not have space to store refrigerant (NO in step ST12), the operation control unit 91 exerts control to perform the refrigerant transfer operation (step ST13). At this time, the connection state set by the flow switching device 11 is switched to the second connection state, and the operation of the compressor 10 is stopped. Control is performed such that the first shut-off device 15 is kept in the closed state, the expansion devices 20 are fully opened, and the use-side fans 22 and the heat-source-side fan 16 are driven at full speed. Furthermore, the operation control unit 91 sets the set time Ts in the time measurement unit 92 at the time of starting the refrigerant transfer operation, and causes the time measurement unit 92 to measure time for which the refrigerant transfer operation is performed. When the refrigerant transfer operation is performed, liquid refrigerant R stored in the heat-source-side heat exchanger 12 is transferred to the accumulator 13 through the flow switching device 11, and space for storage of refrigerant is provided in the heat-source-side heat exchanger 12.

When the operation control unit 91 is notified of the elapse of the set time Ts by the time measurement unit 92, or when the operation control unit 91 determines in step ST12 that the heat-source-side heat exchanger 12 has space for storage of refrigerant (YES in step ST12), the operation control unit 91 exerts control to perform the refrigerant retrieval operation (step ST14). At this time, the flow switching device 11 is controlled to switch the connection state to the first connection state, and the compressor 10 is driven at a frequency determined on the basis of the discharge pressure Pd. Control is performed such that the first shut-off device 15 is kept in the closed state, the expansion devices 20 are fully opened, and the use-side fans 22 and the heat-source-side fan 16 are driven at full speed. That is, when the refrigerant transfer operation is changed to the refrigerant retrieval operation, the connection state set by the flow switching device 11 and an operation state of the compressor 10 are switched, and the states of the first shut-off device 15, the expansion devices 20, the use-side fans 22, and the heat-source-side fan 16 are maintained. When the refrigerant retrieval operation is performed, refrigerant in the use-side circuit 102 is retrieved into the outdoor unit 1, and liquid refrigerant is stored in the accumulator 13, and gas refrigerant is caused to flow into the heat-source-side heat exchanger 12 through the compressor 10 and the flow switching device 11 and is condensed and stored in the heat-source-side heat exchanger 12.

After the refrigerant retrieval operation is started, when predetermined time elapses, the operation control unit 91 determines whether refrigerant on the indoor side is completely retrieved or not (step ST15). This determination of the operation control unit 91 is made based on the suction pressure Ps measured by the suction pressure sensor 82. When the operation control unit 91 determines that refrigerant on the indoor side is not completely retrieved (NO in step ST15), the process returns to step ST12, and the operation control unit 91 repeatedly executes the processes of steps ST12 to ST15 to continuously retrieve refrigerant.

By contrast, when the amount of the refrigerant in the use-side circuit 102 is reduced, and the operation control unit 91 determines that refrigerant on the indoor side is completely retrieved (YES in step ST15), the operation control unit 91 switches the operation from the refrigerant retrieval operation to the outflow prevention operation (step ST16). At this time, the compressor 10 is stopped, and the connection state set by the flow switching device 11 is switched to the second connection state. Each of the first shut-off device 15 and the use-side fans 22 is kept in the same state as in the refrigerant retrieval operation. By contrast, the expansion devices 20 are fully closed, and the heat-source-side fan 16 is stopped. When the outflow prevention operation is performed, retrieved refrigerant is shut up in the outdoor unit 1. Also after the refrigerant is retrieved, the use-side fans 22 are driven to agitate refrigerant in the indoor space, thus reducing an increase in the refrigerant concentration of a particular region of the indoor space, which would be increased unless the refrigerant were agitated. The operation control unit 91 ends the leak-amount reduction mode after causing the outflow prevention operation to be performed (step ST17).

As described above, in Embodiment 1, when a refrigerant leak is detected, the air-conditioning apparatus 100 performs the leak-amount reduction operation in which the refrigerant retrieval operation and the refrigerant transfer operation are performed. In the refrigerant retrieval operation, the controller 90 exerts control to close the first shut-off device 15, to cause the flow switching device 11 to switch the connection state to the first connection state, and to drive the compressor 10. In the refrigerant transfer operation, the controller 90 exerts control to cause the flow switching device 11 to switch the connection state to the second connection state, and to stop the compressor 10.

Thereby, in the refrigerant retrieval operation, the pressure difference between the refrigerant pressure of each of the indoor units 2a and 2b and the atmospheric pressure in the indoor space is reduced to reduce the refrigerant leak rate and retrieve the refrigerant in the use-side circuit 102 into the outdoor unit 1, as a result of which the amount of refrigerant in the use-side circuit 102 and the amount of the refrigerant leak can be reduced. Furthermore, in the refrigerant transfer operation, the refrigerant in the heat-source-side heat exchanger 12 can be transferred to the accumulator 13 because of the pressure difference between the heat-source-side heat exchanger 12 and the accumulator 13, and the amount of refrigerant that can be stored in the outdoor unit 1 can be increased. In such a manner, the air-conditioning apparatus 100 can reduce the amount of the refrigerant leak into the indoor space, and also efficiently retrieve refrigerant into the outdoor unit 1. Furthermore, in the air-conditioning apparatus 100, since refrigerant retrieval from the use-side circuit 102 and refrigerant transfer in the outdoor unit 1 are performed through the flow switching device 11, unlike an existing air-conditioning apparatus, it is not necessary to provide a bypass, and the refrigerant circuit 101 can be simplified.

Furthermore, at the time of performing the refrigerant retrieval operation, the controller 90 exerts control to fully open the expansion devices 20, and to increase the frequency of the compressor 10 when the discharge pressure Pd is less than the target value Pda, and to decrease the frequency of the compressor 10 when the discharge pressure Pd exceeds the target value Pda. Thereby, in the refrigerant retrieval operation, the amount of refrigerant leak can be reduced by reducing the refrigerant pressure at the use-side circuit 102, and the amount of refrigerant on the use-side can be promptly reduced by controlling the operating frequency of the compressor 10.

Furthermore, the controller 90 exerts control to perform the refrigerant transfer operation, when the discharge pressure Pd is greater than or equal to the discharge pressure threshold Pdt set in advance. Thereby, the refrigerant transfer operation can be performed in the case where the heat-source-side heat exchanger 12 is filled with refrigerant, and the amount of the refrigerant leak at the use-side circuit 12 and the amount of refrigerant therein can be efficiently reduced by switching between the refrigerant retrieval operation and the refrigerant transfer operation.

Also, the discharge pressure threshold Pdt is set greater than or equal to the target value Pda. Thereby, the refrigerant transfer operation can be made effective after the amount of refrigerant leak at the use-side circuit 102 is reduced by the refrigerant retrieval operation, and the control is simplified.

The controller 90, at the time of performing the refrigerant transfer operation, exerts control to fully close the first shut-off device 15, and to fully open the expansion devices 20. Thereby, in the air-conditioning apparatus 100, which can perform the cooling operation and the heating operation, the refrigerant transfer operation can be performed with a simple circuit configuration, and unlike an existing air-conditioning apparatus, it is not necessary to provide a bypass or other elements.

The controller 90 includes a timer (the time measurement unit 92) that measures time for which the refrigerant transfer operation is performed, and ends the refrigerant transfer operation when the time measured by the timer, that is, the time for which the refrigerant transfer operation is performed, reaches or exceeds the set time Ts. Thereby, the timing of ending the refrigerant transfer operation can be controlled using the timer, and refrigerant can be reliably transferred from the heat-source-side heat exchanger 12 to the accumulator 13.

Furthermore, the controller 90, at the time of performing the leak-amount reduction operation, performs the outflow prevention operation in which the compressor 10 is stopped, and the outflow of refrigerant stored in the storage unit 14 to the use-side heat exchanger 21 is restricted by the refrigerant retrieval operation and the refrigerant transfer operation. Thereby, also after refrigerant in the use-side circuit 102 is retrieved into the storage unit 14, the retrieved refrigerant can be prevented from flowing to the use-side circuit 102, and the amount of refrigerant in the indoor space can be reduced.

Also, the controller 90, at the time of performing the outflow prevention operation, exerts control to cause the flow switching device 11 to switch the connection state to the second connection state, to fully close the first shut-off device 15, and to fully close the expansion devices 20. Thereby, movement of refrigerant between the outdoor unit 1 and the indoor units 2a and 2b is shut off by the first shut-off device 15 and the compressor 10, and movement of refrigerant in the use-side circuit 102 is restricted by the expansion devices 2, whereby the refrigerant leak into the indoor space can be further reduced.

Furthermore, when the suction pressure Ps detected by the suction pressure sensor 82 is less than or equal to the suction pressure threshold Pst set in advance, the controller 90 exerts control to perform the outflow prevention operation. Thereby, control can be performed such that the refrigerant retrieval operation is changed to the outflow prevention operation, after the amount of refrigerant leak at the use-side circuit 102 and the amount of refrigerant in the use-side circuit 102 are reliably reduced.

The air-conditioning apparatus 100 further includes the heat-source-side fan 16 and the use-side fans 22. The controller 90 sets the rotation speed of the heat-source-side fan 16 to a maximum value when causing the refrigerant retrieval operation or the refrigerant transfer operation to be performed, and sets the rotation speed of the use-side fans 22 to a maximum value when performing the refrigerant retrieval operation, the refrigerant transfer operation, or the outflow prevention operation. Thereby, the refrigerant can be efficiently condensed at the heat-source-side heat exchanger 12 by the operation of the heat-source-side fan 16, and refrigerant that leaks in the indoor space can be agitated by the operation of the use-side fans 22 to reduce the refrigerant concentration.

The air-conditioning apparatus 100 includes the outdoor unit 1 that houses in the housing, at least the compressor 10, the flow switching device 11, the heat-source-side heat exchanger 12, the first shut-off device 15, and the accumulator 13. Therefore, the heat-source-side heat exchanger 12 and the accumulator 13 where a large amount of moved refrigerant is present can be installed outside the indoor space, and in addition can be isolated from the indoor side by the outdoor unit 1.

Furthermore, the air-conditioning apparatus 100 includes the heat medium heat exchanger that causes refrigerant and a heat medium to exchange heat with each other, and the use-side heat exchanger 21 conditions air in the indoor space with the heat medium that has been caused to exchange heat with the refrigerant by the heat medium heat exchanger. Thereby, heat is transferred to the indoor space by the heat medium, thus reducing the risk of leakage of refrigerant into the indoor space.

Embodiment 2

Figure 10:
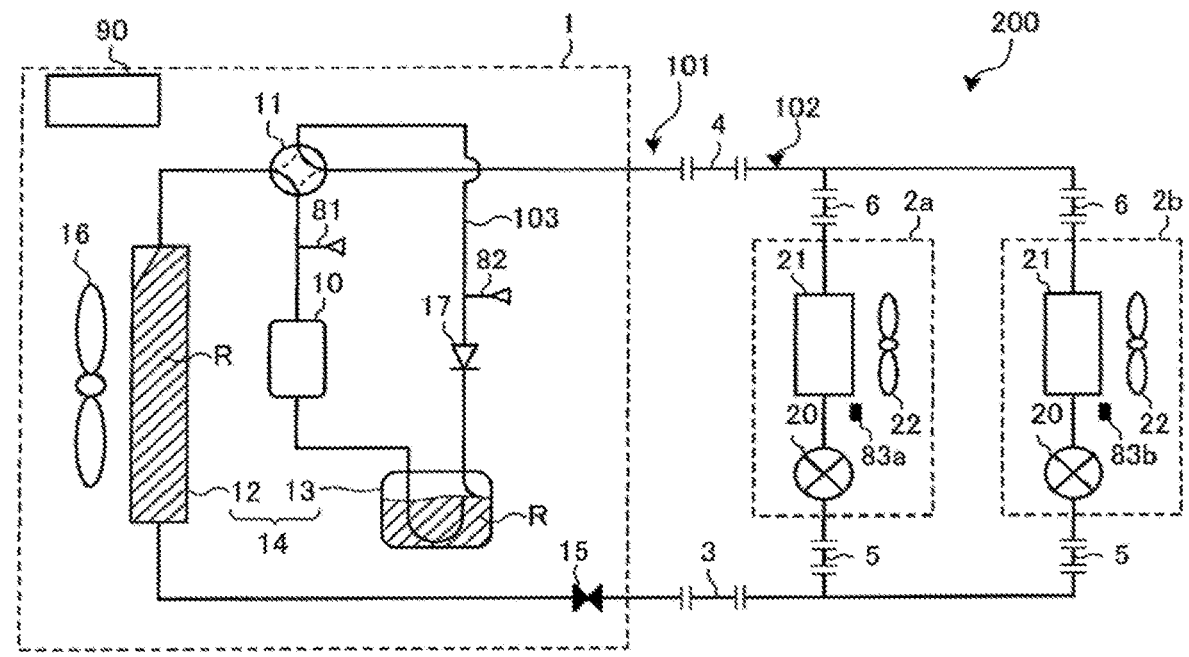
FIG. 10 is a diagram schematically illustrating an example of a circuit configuration of an air-conditioning apparatus according to Embodiment 2 of the present invention.

FIG. 10 is a diagram schematically illustrating an example of a circuit configuration of an air-conditioning apparatus according to Embodiment 2 of the present invention. It should be noted that in an air-conditioning apparatus 200 as illustrated in FIG. 10, components that have the same configurations as those of the air-conditioning apparatus 100 as illustrated in FIG. 1 are denoted by the same reference signs, and their descriptions will be omitted. The air-conditioning apparatus 200 according to Embodiment 2 is different from that of Embodiment 1 in the configuration of the outdoor unit 1. In Embodiment 2, the outdoor unit 1 includes a check valve 17 at a pipe 103 between the flow switching device 11 and the accumulator 13.

The outflow prevention operation in Embodiment 2 will be described. It should be noted that the refrigerant retrieval operation and the refrigerant transfer operation in Embodiment 2 are the same as those in Embodiment 1.

<Outflow Prevention Operation>

In the outflow prevention operation in Embodiment 2, the controller 90 exerts control to cause the flow switching device 11 to switch the connection state set thereby to the first connection state, and to stop the compressor 10. Each of the first shut-off device 15 and the use-side fans 22 is kept in the same state as at the time of performing the refrigerant retrieval operation, the first shut-off device 15 is closed, and the use-side fans 22 are driven at full speed. Furthermore, the controller 90 exerts control to fully close the expansion devices 20 and to stop the heat-source-side fan 16.

When the outflow prevention operation is performed, no flow of the refrigerant is produced in the refrigerant circuit 101. Liquid refrigerant R stored in the storage unit 14 is isolated from the use-side circuit 102 by the first shut-off device 15 and the check valve 17, and the flow of refrigerant from the outdoor unit 1 to the use-side circuit 102 is shut off.

As described above, in Embodiment 2, the air-conditioning apparatus 200 includes the check valve 17 that is provided at the pipe 103 connecting the flow switching device 11 and the accumulator 13. The check valve 17 allows the flow from the flow switching device 11 to the accumulator 13, and shuts off the flow from the accumulator 13 to the flow switching device 11. At the time of performing the outflow prevention operation, the controller 90 exerts control to cause the flow switching device 11 to switch the connection state set thereby to the first connection state, to fully close the first shut-off device 15, and to fully close the expansion devices 20.

Thereby, in the outflow prevention operation, it is possible to prevent movement of refrigerant between the outdoor unit 1 and the indoor units 2a and 2b using the first shut-off device 15 and the check valve 17. Furthermore, at the time of performing the outflow prevention operation, it is not necessary to switch the connection state set by the flow switching device 11, and it is therefore possible to reduce the frequency of occurrence of a failure at the flow switching device 11.

Embodiment 3

Figure 11:
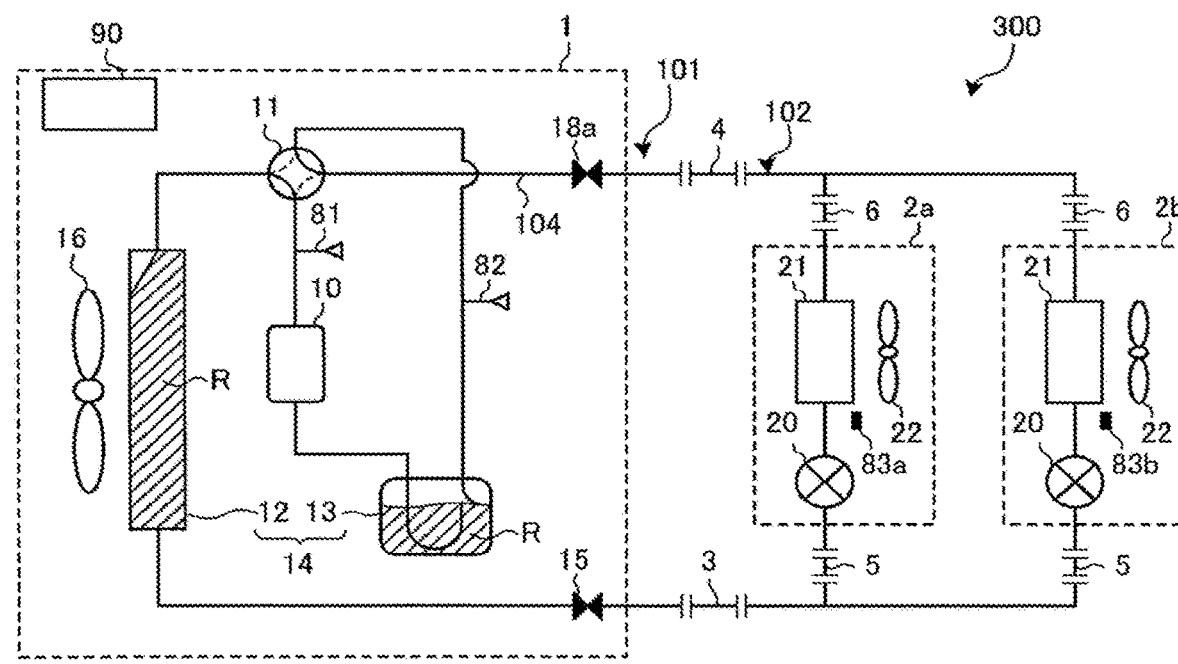
FIG. 11 is a diagram schematically illustrating an example of a circuit configuration of an air-conditioning apparatus according to Embodiment 3 of the present invention.

FIG. 11 is a diagram schematically illustrating an example of a circuit configuration of an air-conditioning apparatus according to Embodiment 3 of the present invention. It should be noted that with respect to an air-conditioning apparatus 300 as illustrated in FIG. 11, components which have the same configurations as those of the air-conditioning apparatus 100 as illustrated in FIG. 1 will be denoted by the same reference signs, and their descriptions will be omitted. The air-conditioning apparatus 300 according to Embodiment 3 is different from that of Embodiment 1 in the configuration of the outdoor unit 1. In Embodiment 3, the outdoor unit 1 includes a second shut-off device 18a at a pipe 104 between the main gas pipe 4 and the flow switching device 11.

The outflow prevention operation in Embodiment 3 will be described. It should be noted that the refrigerant retrieval operation and the refrigerant transfer operation in Embodiment 3 are the same as those in Embodiment 1.

<Outflow Prevention Operation>

In the outflow prevention operation in Embodiment 3, the controller 90 exerts control to close the second shut-off device 18a, cause the flow switching device 11 to switch the connection state to the first connection state, and stops the compressor 10. Each of the first shut-off device 15 and the use-side fans 22 is kept in the same state as at the time of performing the refrigerant retrieval operation, the first shut-off device 15 is closed, and the use-side fans 22 are driven at full speed. Furthermore, the controller 90 exerts control to fully close the expansion devices 20 and to stop the heat-source-side fan 16.

When the outflow prevention operation is performed, no flow of the refrigerant is produced in the refrigerant circuit 101. Liquid refrigerant R stored in the storage unit 14 is isolated from the use-side circuit 102 by the first shut-off device 15 and the second shut-off device 18a, and the flow of refrigerant from the outdoor unit 1 to the use-side circuit 102 is shut off.

As described above, in Embodiment 3, the air-conditioning apparatus 300 includes the second shut-off device 18a provided at the pipe 104 connecting the flow switching device 11 and the use-side heat exchangers 21. The controller 90, at the time of performing the outflow prevention operation, exerts control to cause the flow switching device 11 to switch the connection state to the first connection state, to fully close the first shut-off device 15 and the second shut-off device 18a, and to fully close the expansion devices 20.

Thereby, in the outflow prevention operation, it is possible to prevent movement of refrigerant between the outdoor unit 1 and the indoor units 2a and 2b using the first shut-off device 15 and the second shut-off device 18a. Furthermore, at the time of performing the outflow prevention operation, it is not necessary to switch the connection state set by the flow switching device 11, and it is therefore possible to reduce the frequency of occurrence of a failure at the flow switching device 11.

Embodiment 4

Figure 12:
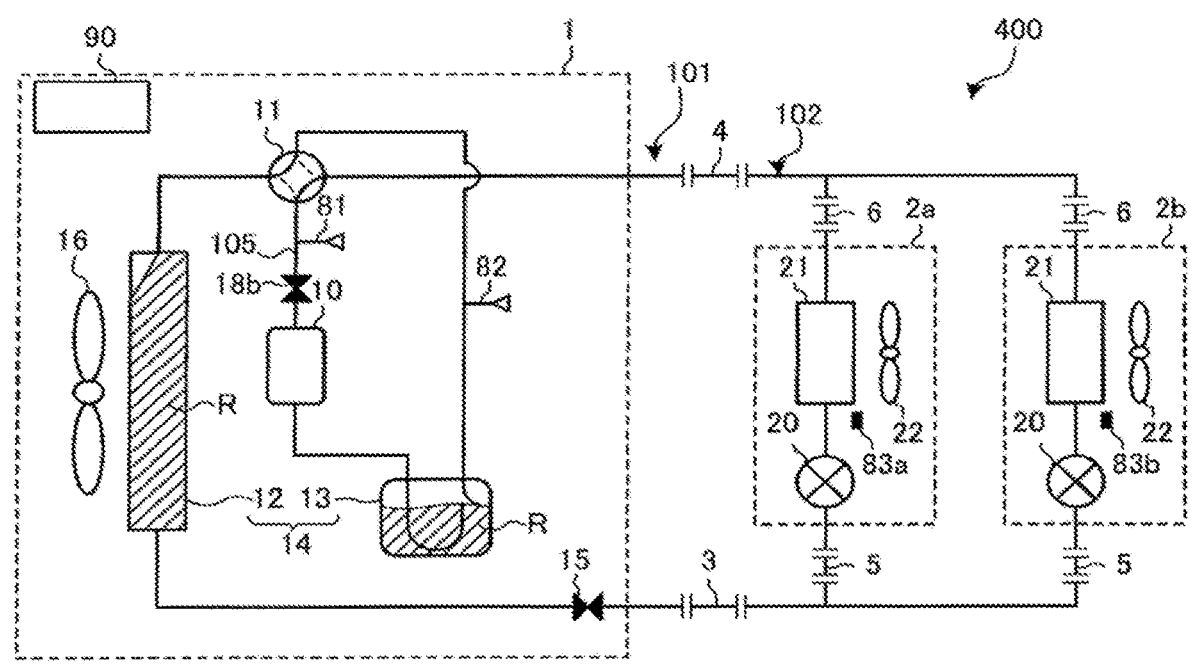
FIG. 12 is a diagram schematically illustrating an example of a circuit configuration of an air-conditioning apparatus according to Embodiment 4 of the present invention.

FIG. 12 is a diagram schematically illustrating an example of a circuit configuration of an air-conditioning apparatus according to Embodiment 4 of the present invention. It should be noted that with respect to an air-conditioning apparatus 400 as illustrated in FIG. 12, components that have the same configurations as those of the air-conditioning apparatus 100 as illustrated in FIG. 1 will be denoted by the same reference signs, and their descriptions will thus be omitted. The air-conditioning apparatus 400 according to Embodiment 4 is different from that according to Embodiment 1 in the configuration of the outdoor unit 1. In Embodiment 4, the outdoor unit 1 includes a second shut-off device 18b at a pipe 105 between the compressor 10 and the flow switching device 11.

The outflow prevention operation in Embodiment 4 will be described. It should be noted that the refrigerant retrieval operation and the refrigerant transfer operation in Embodiment 4 are the same as those in Embodiment 1.

<Outflow Prevention Operation>

In the outflow prevention operation in Embodiment 4, the controller 90 exerts control to cause the flow switching device 11 to switch the connection state to the second connection state, to close the second shut-off device 18b, and to stop the compressor 10. Each of the first shut-off device 15 and the use-side fans 22 is kept at the same state as at the time of performing the refrigerant retrieval operation, the first shut-off device 15 is closed, and the use-side fans 22 are driven at full speed. Furthermore, the controller 90 exerts control to fully close the expansion devices 20 and to stop the heat-source-side fan 16.

When the outflow prevention operation is performed, no flow of the refrigerant is produced in the refrigerant circuit 101. Liquid refrigerant R stored in the storage unit 14 is isolated from the use-side circuit 102 by the first shut-off device 15, the compressor 10, and the second shut-off device 18b, and the flow of refrigerant from the outdoor unit 1 to the use-side circuit 102 is shut off.

As described above, in Embodiment 4, the air-conditioning apparatus 400 further includes the second shut-off device 18b provided at the pipe 105 connecting the compressor 10 and the flow switching device 11. The controller 90, at the time of performing the outflow prevention operation, exerts control to cause the flow switching device 11 to switch the connection state to the second connection state, to fully close the first shut-off device 15 and the second shut-off device 18b, and to fully close the expansion devices 20.

Thereby, in the outflow prevention operation, movement of refrigerant between the outdoor unit 1 and the use-side circuit 102 can be shut off by the first shut-off device 15, the compressor 10, and the second shut-off device 18b. In particular, it should be noted that after refrigerant retrieval, the flow to the main gas pipe 4 is shut off by both the compressor 10 and the second shut-off device 18b, and thus even in the case where refrigerant flows through the compressor 10 because of the structure of the compressor 10, it is possible to reduce the outflow of refrigerant to the use-side circuit 102.

It should be noted that the embodiments of the present invention are not limited to the above embodiments, and can be variously modified. For example, although FIG. 1 illustrates the case where the controller 90 is provided in the outdoor unit 1, at least one of the two indoor units 2a and 2b may be provided with the controller 90, or the outdoor unit 1 and the indoor units 2a and 2b may be provided with respective controllers 90.

REFERENCE SIGNS LIST 1 outdoor unit, 2a, 2b indoor unit, 3 main liquid pipe, 4 main gas pipe, 5 branch liquid pipe, 6 gas branch pipe, 10 compressor, 11 flow switching device, 12 heat-source-side heat exchanger, 13 accumulator, 14 storage unit, 15 first shut-off device, 16 heat-source-side fan, 17 check valve, 18a, 18b second shut-off device, 20 expansion device, 21 use-side heat exchanger, 22 use-side fan, 81 discharge pressure sensor, 82 suction pressure sensor, 83a, 83b refrigerant leak detection device, 90 controller, 91 operation control unit, 92 time measurement unit, 93 storage unit, 100, 200, 300, 400 air-conditioning apparatus, 101 refrigerant circuit, 102 use-side circuit, 103, 104, 105 pipe, R liquid refrigerant

The invention claimed is:

1. An air-conditioning apparatus comprising:
a refrigeration circuit in which a compressor, a flow switching device, a heat-source-side heat exchanger, an expansion device, a use-side heat exchanger, and an accumulator are connected by pipes, the compressor being configured to compress refrigerant and discharge the compressed refrigerant, the flow switching device being provided on a discharge side of the compressor and configured to change a flow passage of the refrigerant in a switching manner, the expansion device being configured to reduce a pressure of the refrigerant, the use-side heat exchanger being configured to condition air in an indoor space, the accumulator being provided on a suction side of the compressor and configured to store liquid refrigerant;
a first shut-off device provided at a pipe that connects the heat-source-side heat exchanger and the expansion device;
a refrigerant leak detection device configured to detect a leak of refrigerant into the indoor space; and
a controller configured to control the compressor, the flow switching device, and the first shut-off device, and to cause a leak-amount reduction operation to be performed when the refrigerant leak detection device detects the leak of refrigerant,
wherein the controller is configured to control the flow switching device to switch a connection state set by the flow switching device between a first connection state and a second connection state, the first connection state being a connection state in which the discharge side of the compressor is connected to the heat-source-side heat exchanger and the suction side of the compressor is connected to the use-side heat exchanger via the accumulator, the second connection state being a connection state in which the discharge side of the compressor is connected to the use-side heat exchanger and the suction side of the compressor is connected to the heat-source-side heat exchanger via the accumulator, and
wherein at time of performing the leak-amount reduction operation, the controller determines whether the heat-source-side heat exchanger has space to store refrigerant or not,
when determining that the heat-source-side heat exchanger has the space, the controller exerts control to perform a refrigerant retrieval operation in which the first shut-off device is closed, the flow switching device is caused to switch the connection state to the first connection state, the compressor is driven, and refrigerant in the use-side heat exchanger is retrieved therefrom into a storage unit including the accumulator and the heat-source-side heat exchanger,
when determining the heat-source-side heat exchanger does not have the space, the controller exerts control to perform a refrigerant transfer operation in which the flow switching device is caused to switch the connection state to the second connection state, the compressor is stopped, and refrigerant condensed at the heat-source-side heat exchanger is transferred to the accumulator through the flow switching device, and
wherein at the time of performing the leak-amount reduction operation, the controller determines whether refrigerant on an indoor side is completely retrieved or not,
when determining that the refrigerant on the indoor side is completely retrieved, the controller exerts control to perform an outflow prevention operation in which the retrieved refrigerant is shut up in the heat-source-side heat exchanger and the accumulator, and
when determining that the refrigerant on the indoor side is not completely retrieved, the controller exerts control to repeatedly perform the refrigerant retrieval operation and the refrigerant transfer operation to continuously retrieve refrigerant.

2. The air-conditioning apparatus of claim 1, wherein, at the time of performing the refrigerant transfer operation, the controller exerts control to fully open the expansion device.

3. The air-conditioning apparatus of claim 1, wherein the controller includes a timer configured to measure time for which the refrigerant transfer operation is performed, and ends the refrigerant transfer operation when the time measured by the timer reaches or exceeds a set time.

4. The air-conditioning apparatus of claim 1, wherein at the time of performing the outflow prevention operation, the controller exerts control to stop the compressor to reduce outflow of refrigerant stored in the storage unit to the use-side heat exchanger by performing the refrigerant retrieval operation and the refrigerant transfer operation.

5. The air-conditioning apparatus of claim 4, wherein, at the time of performing the outflow prevention operation, the controller exerts control to cause the flow switching device to switch the connection state to the second connection state, to fully close the first shut-off device, and to fully close the expansion device.

6. The air-conditioning apparatus of claim 4, further comprising a check valve provided at a pipe that connects the flow switching device and the accumulator, and configured to allow a flow from the flow switching device to the accumulator, and to shut off a flow from the accumulator to the flow switching device,
wherein, at the time of performing the outflow prevention operation, the controller exerts control to cause the flow switching device to switch the connection state to the first connection state, to fully close the first shut-off device, and to fully close the expansion device.

7. The air-conditioning apparatus of claim 4, further comprising a second shut-off device provided at a pipe that connects the flow switching device and the use-side heat exchanger,
wherein, at the time of performing the outflow prevention operation, the controller exerts control to cause the flow switching device to switch the connection state to the first connection state, to fully close the first shut-off device and the second shut-off device, and to fully close the expansion device.

8. The air-conditioning apparatus of claim 4, further comprising a second shut-off device provided at a pipe that connects the compressor and the flow switching device,
wherein, at the time of performing the outflow prevention operation, the controller exerts control to cause the flow switching device to switch the connection state to the second connection state, to fully close the first shut-off device and the second shut-off device, and to fully close the expansion device.

9. The air-conditioning apparatus of claim 1, further comprising:
a heat-source-side fan configured to supply air to the heat-source-side heat exchanger; and
a use-side fan configured to supply air to the use-side heat exchanger,
wherein the controller is configured to:
set a rotation speed of the heat-source-side fan to a maximum value when the controller causes the refrigerant retrieval operation or the refrigerant transfer operation to be performed, and
set a rotation speed of the use-side fan to a maximum value when the controller causes the refrigerant retrieval operation, the refrigerant transfer operation, or the outflow prevention operation to be performed.

10. The air-conditioning apparatus of claim 1, comprising an outdoor unit that houses at least the compressor, the flow switching device, the heat-source-side heat exchanger, the first shut-off device, and the accumulator.

11. The air-conditioning apparatus of claim 1, further comprising a heat medium heat exchanger configured to cause heat exchange to be performed between the refrigerant and a heat medium,
wherein the use-side heat exchanger causes air in the indoor space to be conditioned by the heat medium after the heat medium is subjected to the heat exchange at the heat medium heat exchanger.

12. The air-conditioning apparatus of claim 1, further comprising a discharge pressure sensor configured to detect a discharge pressure of refrigerant discharged from the compressor,
wherein the controller determines whether the heat-source-side heat exchanger has the space based on the discharge pressure detected by the discharge pressure sensor.

13. The air-conditioning apparatus of claim 12,
wherein, at the time of performing the refrigerant retrieval operation, the controller exerts control to fully open the expansion device, to increase a frequency of the compressor when the discharge pressure detected by the discharge pressure sensor is less than a target value, and to decrease the frequency of the compressor when the discharge pressure is greater than the target value.

14. The air-conditioning apparatus of claim 12, wherein the controller determines that the heat-source-side heat exchanger does not have the space when the discharge pressure is greater than or equal to a discharge pressure threshold set in advance.

15. The air-conditioning apparatus of claim 12, wherein the controller, at the time of performing the refrigerant retrieval operation, exerts control to fully open the expansion device, to increase a frequency of the compressor when the discharge pressure detected by the discharge pressure sensor is less than a target value, and to decrease the frequency of the compressor when the discharge pressure is greater than the target value, and
the controller determines that the heat-source-side heat exchanger does not have the space when the discharge pressure is greater than or equal to the discharge pressure threshold set in advance, the discharge pressure threshold being set to the target value or more.

16. The air-conditioning apparatus of claim 1, further comprising a suction pressure sensor configured to detect a suction pressure of refrigerant that is sucked into the compressor,
wherein the controller, at the time of performing the leak-amount reduction operation, determines whether the refrigerant on the indoor side is completely retrieved or not based on the suction pressure detected by the suction pressure sensor.

17. The air-conditioning apparatus of claim 16,
wherein the controller determines that the refrigerant on the indoor side is completely retrieved, when the suction pressure detected by the suction pressure sensor is less than or equal to a suction pressure threshold set in advance.

18. The air-conditioning apparatus of claim 1, wherein when determining that the refrigerant on the indoor side is not completely retrieved, the controller ends the refrigerant transfer operation and causes the refrigerant retrieval operation to be performed, after predetermined time elapses from time at which the refrigerant retrieval operation is started, or when the controller determines that the heat-source-side heat exchanger has the space.

19. The air-conditioning apparatus of claim 1, wherein
the controller includes a timer configured to measure time
  from time at which the refrigerant retrieval operation is
  started, and
the controller determines whether the refrigerant on the
  indoor side is completely retrieved or not, when the
  time measured by the timer reaches time set in advance.

* * * * *